United States Patent

Heine et al.

[15] 3,649,170

[45] Mar. 14, 1972

[54] PROCESS FOR THE PRODUCTION OF HYDROXYLAMMONIUM SALTS

[72] Inventors: Heinz Heine; Rudolf Gerken, both of Farbenfabriken Bayer AG, Krefled-Uerdingen, Germany

[22] Filed: Jan. 21, 1970

[21] Appl. No.: 4,448

Related U.S. Application Data

[63] Continuation of Ser. No. 607,882, Jan. 9, 1967, abandoned.

[30] Foreign Application Priority Data

Jan. 21, 1966 Germany ..............................F 48222

[52] U.S. Cl. ......................................23/50, 23/87, 23/102, 23/105, 23/117, 23/190 A
[51] Int. Cl. .......................................................C01b 21/14

[58] Field of Search................23/50, 87, 102, 105, 117, 190, 23/190 A

[56] References Cited

UNITED STATES PATENTS

| | | | |
|---|---|---|---|
| 2,628,889 | 2/1953 | Benson | 23/190 A |
| 2,719,778 | 10/1955 | Jockers | 23/190 A |

*Primary Examiner*—Earl C. Thomas
*Attorney*—Connolly and Hutz

[57] ABSTRACT

Process for the production of hydroxylammonium salts by reduction of nitric oxide with hydrogen in dilute mineral acid solution in the presence of noble-metal catalysts and modifiers such as formic acid, water-soluble formates, oxalic acid, chloral hydrate or carbon monoxide.

4 Claims, No Drawings

PROCESS FOR THE PRODUCTION OF HYDROXYLAMMONIUM SALTS

This application is a continuation of application, Ser. No. 607,882 filed Jan. 9, 1967 and now abandoned.

FIELD OF THE INVENTION

This invention relates to a process for the production of hydroxylammonium salts.

DESCRIPTION OF THE PRIOR ART

It is known that hydrogen and nitric oxide can be reacted in an acid medium on noble-metal catalysts to hydroxylammonium salts (German Pat. No. 968,363 and German Auslegeschrift No. 1,177,118). It is also known that with decreasing sulfuric acid concentration (or with increasing hydroxylammonium salt concentration) the extent of side reactions, especially the formation of ammonium salts increase. Various processes have been proposed to improve the selectivity of the reaction. Other suggestions relate to improved catalysts, especially with additives introduced either during or following the preparation of the catalyst. One proposed improvement in the reaction velocity and hence in the yield per unit of volume and time is described, for example, in German Pat. specification No. 885,396, according to which the catalytic reaction is carried out in the presence of organic compounds containing polar groups and an average number of from four to 10 carbon atoms per molecule.

SUMMARY OF THE INVENTION

It is an object of the present invention to provide a process for the production of hydroxylammonium salts with high yields. It is another object of the present invention to provide a process for the production of hydroxylammonium salts, wherein the catalysts are maintained at high selectivity and activity. Other objects will be described in the following description.

A process for the preparation of hydroxylammonium salts from nitric oxide and hydrogen has now been found in which formic acid, water-soluble formates, oxalic acid, chloral hydrate or carbon monoxide is used as modifier. In this process, the average selectivity and activity of the commonly used catalysts is surprisingly higher, particularly when formic acid is added, while on the other hand the selectivity remains almost constant and at a high level throughout the reaction, i.e., despite an increase in the hydroxylammonium sulphate concentration. Particular emphasis is placed on this.

DESCRIPTION OF THE PREFERRED EMBODIMENTS

The quantities of the aforementioned modifiers may vary within relatively wide limits, although they are preferably added to the reaction solution in quantities of from 0.1 mMols to 4 Mols per liter.

The production of the hydroxylamine salts is carried out as known per se by introducing nitrogen oxide and hydrogen in an aqueous mineral acid solution containing the suspended catalyst therein. In the discontinuous process, the synthesis gas is fed into the acid catalyst mixture until the acid is nearly consumed, whereby preferably a pH OF 2.5 is not exceeded, to avoid the formation of substantial amounts of ammonium or ammonium salts. The hydroxyl-ammonium salts so obtained are, after removing the catalyst, either precipitated by cooling the reaction solution or the reaction solution with the hydroxylamine salt contained therein is directly used for synthesis, e.g., the production of lactams. The salts can also be used as reducing agents, as photographic developers, as stabilizers, etc.

In the continuous process for the manufacture of hydroxylamine, into the reaction vessel fresh acid is conducted periodically or continuously whereby part of the reaction solution is removed together with the hydroxylamine salt formed. The process also can be carried out stepwise, whereby the reaction mixture is led from step to step, each step being maintained at a constant pH range. The first step starts with the fresh acid, whereby from the last step the substantially neutralized reaction solution together with the hydroxylamine salt is removed.

The reaction temperature is between 0° and 80°C., preferably the reaction is carried out at a temperature of between 40° and 60°C. The concentration of free acid should amount to between 0.01 and 5.0 N; the molar ratio of $NO:H_2$ is normally to be maintained at a range of between 1:1.5 and 1:3.0, preferably of between 1:1.6 and 1:2.0. For reason of economics, the reaction is performed at normal pressure, however, it is possible to apply superpressure also. As acids, the strong mineral acids such as sulfuric acid, hydrochloric acid, phosphoric acid, nitric acid or the like are used.

The metals of the platinum series and advantageously platinum itself may be used as noble metal catalysts. Activated carbon or graphite can be employed as an acid resistant support material for the noble metals.

The terms 'activity' and 'selectivity' used in this specification are defined as follows: activity is the percentage of NO contained in the hydroxylammonium salt and the ammonium salt formed, based on the total quantity of NO introduced, while selectivity is defined as 100 times the ratio: mols of hydroxylammonium salt formed/total number of mols of hydroxylammonium salt and ammonium salt formed.

The invention is illustrated by the following examples:

EXAMPLE 1:

250 mg. of Pt, in the form of a 1% Pt-Catalyst, based on graphite, are introduced into 1 liter of 20% sulfuric acid. A mixture of 12.5 l. of NO and 25 l. of hydrogen per hour is then introduced with stirring in a constant stream at a temperature of from 40° to 45°C. Every 2 hours, the solution is analyzed for hydroxylammonium sulfate and ammonium sulfate, the results being given as activity and selectivity values for the corresponding time interval. Total duration of test = 8 hours. Activity pattern at 2-hour intervals: 85, 85, 47, 40; average = 64.
Selectivity pattern at 2-hour intervals: 58, 57, 17, 0; average = 33.

During the final two hours, almost 20% of the hydroxylammonium sulphate previously formed was degraded again.

EXAMPLE 2:

The procedure is as in Example 1, except that 25 mM. of formic acid were added before the beginning of synthesis.
Total duration of test = 8 hours.
Activity pattern at 2-hour intervals: 84, 79, 79, 80; average = 81.
Selectivity pattern at 2-hour intervals: 96, 96, 96, 99; average = 98.

EXAMPLE 3;

The sulphuric acid catalyst suspension prepared in accordance with Example 1 is heated for 3 hours to 95°C. following the addition of 3 g. of oxalic acid. It is then cooled to 40°C., after which the procedure is as described in Example 1.
Total duration of test = 8 hours.
Activity pattern at two-hour intervals: 88, 80, 77, 72; average = 79.
Selectivity pattern at two-hour intervals: 69, 73, 72, 57; average = 68.

EXAMPLE 4:

The procedure is as described in Example 1, except that, before the beginning of synthesis, carbon monoxide is bubbled through the catalyst suspension at a rate of 20 l./hr. for 15 minutes, and thereafter for a period of 1 minute every 2 hours.
Total duration of test = 8 hours.
Activity pattern at 2-hour intervals: 75, 56, 65, 44; average = 60.
Selectivity pattern at 2-hour intervals: 68, 46, 81, 85; average = 68.

We claim:
1. In a process for the production of hydroxylammonium salts wherein gaseous nitric oxide and hydrogen are reacted in a molar ratio of between about 1 to 1.5 and 1 to 3 in an aqueous mineral acid solution having a free acid content of between 0.01 and 5.0 N and containing a catalyst of the platinum group, at temperatures of between 0° and 80° C., the improvement comprising conducting the reaction in the presence of between 0.1 mM. and 4 Mols per liter of the aqueous mineral acid solution of formic acid, oxalic acid or carbon monoxide.

2. The process according to claim 1 wherein the reaction is conducted in the presence of carbon monoxide.

3. The process according to claim 1 wherein the reaction is conducted in the presence of formic acid.

4. The process according to claim 1 wherein the reaction is conducted in the presence of oxalic acid.

* * * * *